United States Patent
Chen et al.

(10) Patent No.: US 9,130,392 B2
(45) Date of Patent: Sep. 8, 2015

(54) CHARGING CONTROL METHOD OF A RECHARGEABLE BATTERY

(71) Applicant: Simplo Technology Company, Ltd., Hsinchu County (TW)

(72) Inventors: Tai-Hung Chen, Hsinchu County (TW); Kuo-Chang Huang, Hsinchu County (TW)

(73) Assignee: SIMPLO TECHNOLOGY COMPANY, LTD., Hukou Township, Hsinchu County (TW)

( * ) Notice: Subject to any disclaimer, the term of this patent is extended or adjusted under 35 U.S.C. 154(b) by 446 days.

(21) Appl. No.: 13/714,420

(22) Filed: Dec. 14, 2012

(65) Prior Publication Data
US 2014/0042986 A1 Feb. 13, 2014

(30) Foreign Application Priority Data
Aug. 8, 2012 (TW) ............... 101128556 A

(51) Int. Cl.
| H01M 10/44 | (2006.01) |
| H02J 7/00 | (2006.01) |
| H01M 10/48 | (2006.01) |
| G06F 1/26 | (2006.01) |
| H01M 10/42 | (2006.01) |

(52) U.S. Cl.
CPC ............. *H02J 7/007* (2013.01); *G06F 1/263* (2013.01); *H01M 10/48* (2013.01); *H02J 7/0031* (2013.01); *H01M 10/44* (2013.01); *H01M 2010/4271* (2013.01); *H02J 2007/0037* (2013.01); *H02J 2007/0049* (2013.01)

(58) Field of Classification Search
CPC ............. H02J 7/0013; H02J 7/0018; H02J 2007/0049; H02J 7/0026; H02J 7/0021
USPC ......... 320/107, 116, 119, 132, 133, 155, 162; 702/63, 64; 340/636.11, 636.12, 340/636.13
See application file for complete search history.

(56) References Cited

U.S. PATENT DOCUMENTS

| 5,565,759 | A | * | 10/1996 | Dunstan | 320/135 |
| 5,757,163 | A | * | 5/1998 | Brotto et al. | 320/155 |
| 2011/0082621 | A1 | * | 4/2011 | Berkobin et al. | 701/33 |
| 2011/0307033 | A1 | * | 12/2011 | Michaels et al. | 702/63 |
| 2012/0126744 | A1 | | 5/2012 | Kuroda et al. | |

FOREIGN PATENT DOCUMENTS

CN 102549875 7/2012

* cited by examiner

*Primary Examiner* — Edward Tso
(74) *Attorney, Agent, or Firm* — Winston Hsu; Scott Margo

(57) ABSTRACT

By analyzing consecutive timestamps at which the battery cell is fully charged in two or more previous time intervals, the charging control method utilizes these consecutive timestamps of a sub-section of each time interval as a charging control way to the rechargeable battery in a present time interval. The charging process of the rechargeable battery in corresponding timestamps of the present time interval is limited to a specific proportion of the fully charged capacity of the battery cells. In such way, the rechargeable battery may have fewer chances to be fully charged at some less used time, which substantially increases the life of the battery.

4 Claims, 3 Drawing Sheets

| Timestamp / Time Interval | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| Day 1 | 1 | 1 | 1 | 1 | 1 | 1 | 0 | 0 | 0 | 0 | 0 | 0 | 0 | 0 | 0 | 1 | 1 | 0 | 1 | 0 | 0 | 0 | 0 | 0 |
| Day 2 | 1 | 1 | 1 | 1 | 1 | 0 | 1 | 0 | 0 | 0 | 0 | 0 | 0 | 0 | 0 | 0 | 0 | 1 | 0 | 1 | 0 | 0 | 0 | 0 |
| Day 3 | 1 | 0 | 0 | 0 | 1 | 1 | 0 | 1 | 1 | 0 | 0 | 0 | 0 | 0 | 0 | 0 | 0 | 0 | 1 | 0 | 0 | 1 | 0 | 0 |
| Day 4 | 0 | 0 | 0 | 0 | 0 | 1 | 0 | 1 | 1 | 1 | 0 | 0 | 0 | 0 | 0 | 0 | 0 | 1 | 0 | 0 | 1 | 1 | 0 | 0 |
| Day 5 | 0 | 1 | 0 | 1 | 0 | 1 | 1 | 0 | 1 | 1 | 0 | 0 | 0 | 0 | 0 | 0 | 0 | 1 | 0 | 1 | 1 | 0 | 0 | 1 |

FIG. 3

CHARGING CONTROL METHOD OF A RECHARGEABLE BATTERY

BACKGROUND OF THE INVENTION

1. Field of the Invention

The invention relates to a charging control method of a rechargeable battery, and more particularly, to a charging control method capable of prolonging the battery life.

2. Description of the Prior Art

Considering the convenience of using an electronic system and the capacity requirement of the power supply, most electronic systems adapt rechargeable battery as the source of its power supply, in which the batteries using lithium polymer as core substance are regarded as the most mature products with high capacity density specification. The rechargeable battery is primarily charged by a power supply unit or via an AC adapter from an electronic system where the rechargeable battery is installed. When the electronic system such as a laptop computer is in use, with the AC adapter connected, the electronic system usually consumes power from the power source via the AC adapter instead of from the rechargeable battery. Once the power from the AC adapter is disconnected from the electronic system, the rechargeable battery provides power for the electronic system until the AC adapter with power is reconnected to both provide power for the electronic system and charge the rechargeable battery all the way when the rechargeable battery reaches the full charge capacity (FCC). Such repetitive change between fully charged state and not fully charged state is very common for the rechargeable battery. One nature of the rechargeable battery should be taken care of: the life of a rechargeable battery may be damaged when the rechargeable battery is connected to the power supply unit and stays constantly at the 100% fully charged state for a quite a long time.

On the other hand, some regularity may exist according to how a user uses the electronic system. For example, the user may plug an AC adapter to a laptop computer but not use it within a certain period of time for each day. According to the charging design of the prior art, the rechargeable battery of the laptop computer may be charged and maintained at the FCC for at least a couple of hours in the time interval every day, let's say the couple of hours during the night time. It apparently causes unrecoverable damage to the rechargeable battery if the charging scheme of the prior art is adapted.

SUMMARY OF THE INVENTION

It is therefore an objective for the invention to provide an intelligent design of charging mechanism in a rechargeable battery to not overly keep the battery at a 100% fully charged state that may damage the battery life. The embodiments of the invention provides a charging control method that allows a battery control unit inside the rechargeable battery to handle the charging process of the rechargeable battery, taking into consideration of how an user uses the rechargeable battery, in an intelligent way. The method also prolongs the battery life in a substantial scale.

An embodiment of the invention provides a charging control method of rechargeable battery. For a rechargeable battery including a battery cell and a control unit in electrical connection with the battery cell, the method includes using the control unit to execute the following steps: charging the battery cell when a power supply unit is in connection with the battery cell; recording the relative state of charge (RSOC) of the battery cell for a plurality of time intervals, each time interval comprising a plurality of timestamps; and when the RSOC of the battery cell reaches the full charge capacity (FCC) for n consecutive timestamps comprised by a first sub-section of an $N^{th}$ time interval and for n consecutive timestamps comprised by a second sub-section of an $N+1^{th}$ time interval, where the second sub-section corresponds to the first sub-section, the control unit limiting the power supply unit to charge the battery cell to not exceeding a specific proportion of the FCC at n consecutive timestamps comprised by a third sub-section of an $N+2^{th}$ time interval, where the third sub-section corresponds to the first sub-section and the second sub-section. In the embodiment, N is a positive integer and n is a positive integer larger than 1.

For the charging control method provided by the embodiment of the invention, each $N^{th}$ time interval is a day, each $N^{th}$ time interval comprises 24 timestamps, and n is an integer larger than 3 and smaller than 24.

Also for the charging control method provided by the embodiment of the invention, the method further includes step: the control unit allowing the power supply unit to charge the battery cell to the FCC at the timestamps of the $N+2^{th}$ time interval that are not comprised by the third sub-section.

By analyzing consecutive timestamps at which the battery cell is fully charged in two or more previous time intervals or days, the charging control method utilizes these consecutive timestamps of a sub-section of each time interval as a charging control way to the rechargeable battery in a present time interval. The charging process of the rechargeable battery in corresponding timestamps of the present time interval is limited to a specific proportion of the fully charged capacity of the battery cells. In such way, the rechargeable battery may have fewer chances to be fully charged at some less used time, which substantially increases the life of the battery.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 is an illustration of a chart showing an RSOC state of the rechargeable battery versus time applied with the charging control method of the invention.

DETAILED DESCRIPTION

Figure 1:
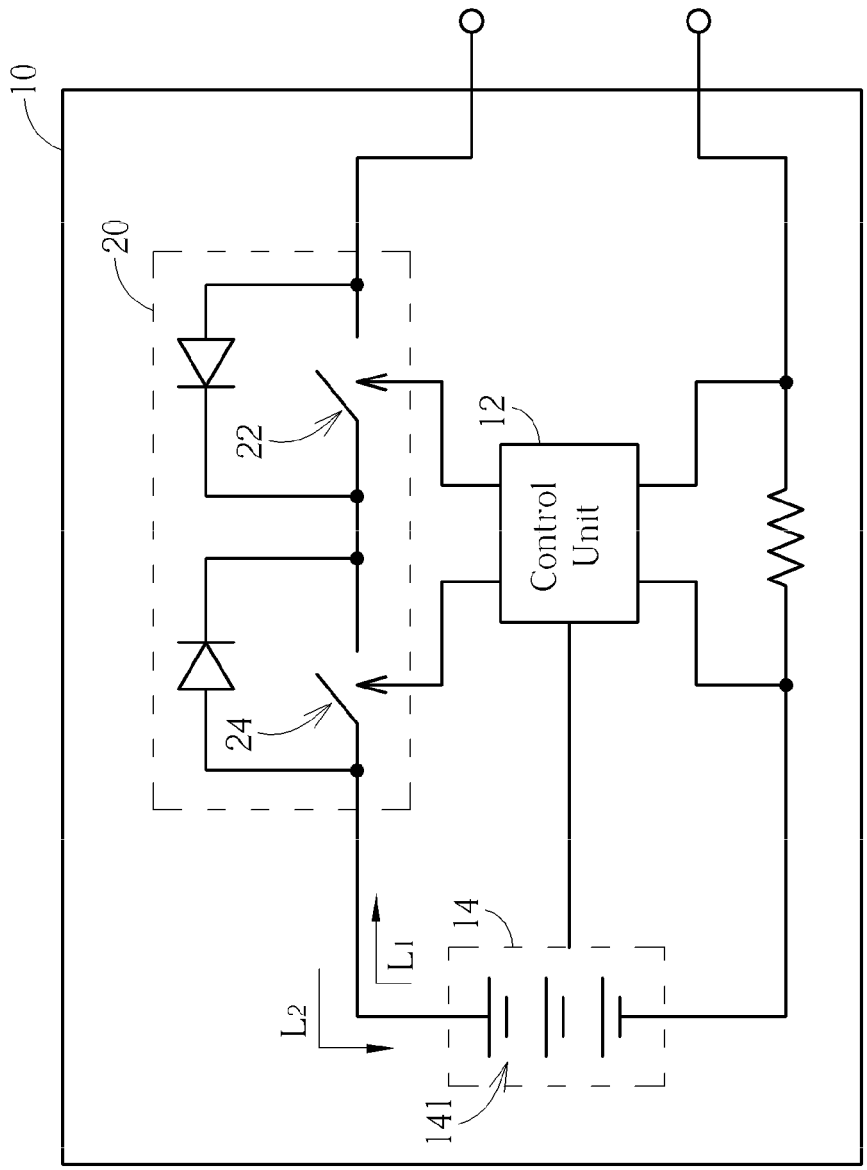
FIG. 1 is an illustration of a rechargeable battery applied with a charging control method provided by the invention.

Please refer to FIG. 1, which is an illustration of a rechargeable battery applied with a charging control method provided by the invention. A rechargeable battery 10 may be installed on an electronic system, which is not shown in the figure, as a power supply source for the electronic system. The rechargeable battery 10 may also be charged by a power supply unit, which is not shown in the figure, when connected to. The rechargeable battery 10 includes a control unit 12, a battery set 14, and a Metal-Oxide-Semiconductor Field-Effect Transistor (MOSFET) circuit module 20. The control unit 12 is a battery control integrated circuit of the rechargeable batter 10 and is electrically connected to the battery set 14 and the MOSFET circuit module 20. The control unit 12 monitors the battery set 14, detects and takes control of data and the discharging/charging process of the battery set 14. The battery set 14 is composed of a plurality of battery cells 141, each connected with one another in serial way, in parallel way, or in hybrid way. Particularly, the battery cells 141 are lithium polymer batter cells. The MOSFET circuit module 20 includes a discharge MOSFET 22 (DXG MOSFET) and a charge MOSFET 24 (CHG MOSFET), which are controlled and turned on/off by the control unit 12. When the DXG MOSFET 22 and the CHG MOSFET 24 are turned on, a charging loop $L_2$ and a discharging loop $L_1$ exist in the rechargeable battery 10.

Figure 2:
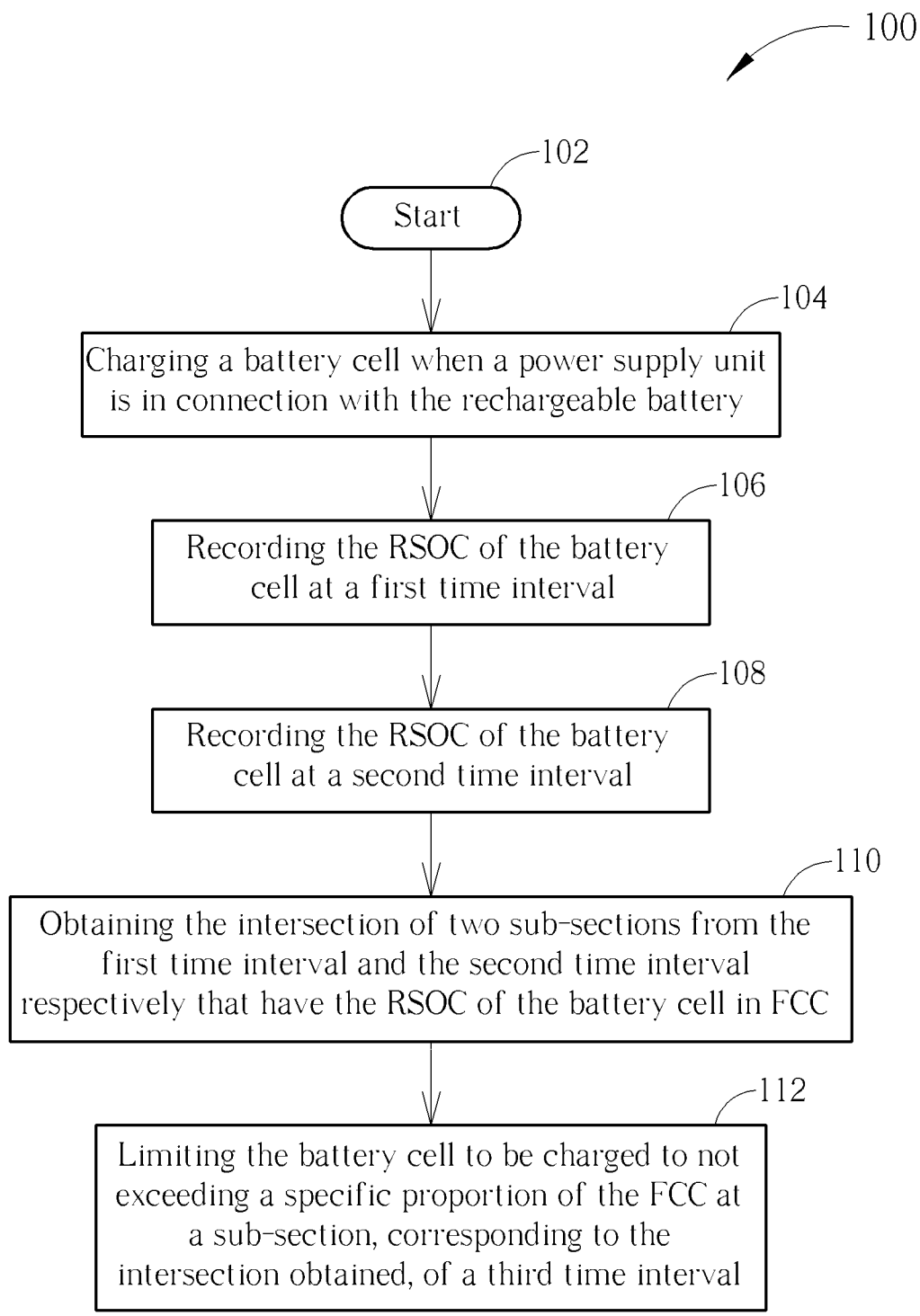
FIG. 2 is an illustration of a flow chart of a charging control method according to the embodiment of the invention.

Please refer to FIG. 2, which is an illustration of a flow chart of a charging control method 100 according to the embodiment of the invention. The charging control method 100 includes the following steps:

Step 102: Start;

Step 104: Charging a battery cell when a power supply unit is in connection with the rechargeable battery;

Step 106: The control unit recording the relative state of charge (RSOC) of the battery cell at a first time interval;

Step 108: The control unit recording the relative state of charge (RSOC) of the battery cell at a second time interval;

Step 110: The control unit obtaining the intersection of two sub-sections from the first time interval and the second time interval respectively that have the RSOC of the battery cell reaches the full charge capacity (FCC);

Step 112: The control unit limiting the battery cell to be charged to not exceeding a specific proportion of the FCC at a sub-section, which corresponds to the intersection obtained in Step 110, of a third time interval.

The charging control method 100 of the invention handles the charging control of the rechargeable battery 100 according to statistic data of the time the rechargeable battery reaches the full charge capacity (FCC), and more specifically, the charging control method 100 takes extra control over the charging process of the battery set 14 at some particular sub-section(s) of the present time interval, according to the regularity of how a user uses the electronic system, so that the rechargeable battery 10 may be less kept at 100% fully charged state. According to this, the rechargeable battery 10 is normally charged once connected with a power supply unit as described in Step 104, and in Step 106 and Step 108, the control unit 12 keeps a record of the relative state of charge (RSOC) of the rechargeable battery 10 for a number of time intervals. More specifically, the time interval will be exemplified as, but not limited to, 24 hours (or a day) in the embodiments of the invention, while each different time interval may have a plurality of timestamps, such as 24 timestamps for each time interval taking one day as an example. In that, the control unit 12 records the relative state of charge of the battery set 14 at each of the plurality of timestamps of each of N time intervals, where N should be regarded as a positive integer.

Next in Step 110, the control unit 12 analyzes the a first sub-section and a second sub-section of a first time interval and a second time interval respectively, in Step 106 and Step 108 that both have the RSOC of the battery cells 141 reaches the FCC (or a limited FCC, which is previously limited by the control unit 12) and obtains a sub-section from the intersection of the two sub-sections. Finally, the method performs Step 112 by placing the charging control over the battery cells 141 at the timestamps in a third sub-section of a third time interval corresponding to the sub-section of the intersection of the two sub-sections obtained in Step 110, i.e., the control unit 12 limits the battery cells 141 only can be charged, if possible, at top to a specific proportion of the FCC at the timestamps of the third sub-section at the third time interval. In such way, the rechargeable battery 10 may be less kept at 100% fully charged state.

Additionally, the rechargeable battery 10 may be at a charging state when connected to the power supply unit or at a discharging state, either discharging to supply power for the electronic system or just self-discharging, when not connected to the power supply unit at each timestamp of each time interval. The control unit 12, however, keeps the records of the RSOC of the battery cells 141 at each timestamp regardless of at which state the rechargeable battery 10 may be, so the method of the invention applies to the rechargeable battery 10 whether or not the rechargeable battery 10 is in connection with the power supply unit. It also should be noted that the RSOC of the battery cells 141 may have chance to reach the FCC only when the rechargeable battery 10 is in connection with the power supply unit and charged.

Please refer to FIG. 3, which is an illustration of a chart showing an RSOC state of the rechargeable battery versus time applied with the charging control method of the invention. In FIG. 3, the total N consecutive time intervals are exemplified as day 1 to day 5, each including 24 timestamps. An index is filled in each of the timestamps of every time interval that records the RSOC of the rechargeable battery 10 and because the charging control method 100 of the invention collects information on the timestamps that the rechargeable battery 10 reaches the FCC (or the limited FCC, which is previously limited by the control unit 12), the index value filled in each timestamp shows only whether the RSOC reaches the FCC and is either 0 or 1, in which 1 represents that the RSOC of the rechargeable battery 10 has yet reached the FCC and 0 represents that the RSOC of the rechargeable battery 10 has reached the FCC (or the limited FCC).

For example, during the 24 timestamps of a first time interval (day 1), both a sub-section $T_1$ with n consecutive timestamps spanning from 6 o'clock to 14 o'clock, which means n equals 9, and a sub-section $T_4$ with n consecutive timestamps spanning from 19 o'clock to 23 o'clock, which means n equals 5, have RSOC of the rechargeable battery 10 at the FCC. Following up during the 24 timestamps of a second time interval (day 2), both a sub-section $T_2$ with n consecutive timestamps spanning from 7 o'clock to 16 o'clock, which means n equals 10, and a sub-section $T_5$ with n consecutive timestamps spanning from 20 o'clock to 23 o'clock, which means n equals 4, also have RSOC of the rechargeable battery 10 at the FCC. From the above data, both a first sub-section $T_{11}$ (including 8 consecutive timestamps from 7-14 o'clock) of the first time interval and a second sub-section $T_{21}$ (including 8 consecutive timestamps from 7-14 o'clock) of the second time interval may be obtained from the intersection of the sub-section $T_1$ and the sub-section $T_2$. Since the RSOC of the rechargeable battery 10 reaches the FCC at the intersection (8 consecutive timestamps from 7-14) of the two sub-sections $T_1$ and $T_2$ from the first time interval and the second time interval, a third sub-section $T_3$ of a third time interval (day 3) that corresponds both to the first sub-section $T_{11}$ and the second sub-section $T_{21}$ and includes 8 consecutive timestamps from 7-14 is the spanning time interval the control unit 12 limits the power supply unit to charge the battery cells 141 to not exceeding a specific proportion of the FCC, for example, to 80% of the FCC. It should be noted that the 0 index in each timestamp during 9 o'clock and 14 o'clock of the third time interval means the battery cells 141 have been charged to a limited FCC, or 80% of the FCC for example, as mentioned earlier. In such way, the battery cells 141 may be limited to have been charged to 100% FCC, which results in damage to the rechargeable battery 10, in the sub-section $T_3$. Also for the timestamps from 15 o'clock in the third time interval, which no longer falls within the sub-section $T_3$ and the battery cells 141 does not limited with any charging condition, the battery cells 141 will be allowed to be charged to 100% FCC, if the case, since 15 o'clock.

There are other intersections in FIG. 3. For example, a sub-section $T_4$ of the first time interval and a sub-section $T_5$ of the second time interval get an intersection including 4 consecutive timestamps from 20 o'clock to 23 o'clock. According to the invention, the control unit 12 limits the power supply unit to charge the battery cells 141 to not exceeding 80% of the FCC at a sub-section $T_6$ of the third time interval (day 3) that corresponds to the intersection and includes 4 consecutive timestamps from 20-23. It also should be noted that the 0 index in each timestamp during 20 o'clock and 23 o'clock of the third time interval means the battery cells 141 have been charged to the limited FCC, or 80% of the FCC for example, as mentioned earlier. Likewise, a sub-section $T_7$ of a fourth time interval (day 4) and a sub-section $T_8$ of a fifth time interval (day 5) are being analyzed for intersection of the sub-sections to be referred to by the control unit 12 for further charging limitation as carried out previously. There are still some intersections in this figure that are not circled out but can be used by the control unit 12 for carrying out the charging control, description about which is omitted here for brevity.

Additionally, the charging control method 100 provided by the invention describes its mechanism by using two preceding time intervals to output the intersection of sub-sections with FCC and determining the charging control of the battery for the next time interval. However, three or more preceding time intervals for analysis of the intersection of sub-sections in need are also available in the invention. The embodiments described in the previous paragraphs should not form a limitation regarding the number of time intervals to be analyzed. Also the specific proportion, say 80%, of the FCC in the embodiment is also for exemplary purpose and should not be regarded as a limitation. Furthermore, for practical implementation and efficiency consideration, a sub-section retrieved in each time interval should at least include two consecutive hours/timestamps that have the RSOC of the rechargeable battery in the FCC, which means n should be a positive integer at least larger than 1 for any sub-section including n consecutive timestamps, and preferably n is a positive integer larger than 3 and smaller 24 to generate practical sub-sections.

By analyzing consecutive timestamps at which the battery cell is fully charged in two or more previous time intervals, the charging control method utilizes these consecutive timestamps of a sub-section of each time interval as a charging control way to the rechargeable battery in a present time interval. The charging process of the rechargeable battery in corresponding timestamps of the present time interval is limited to a specific proportion of the fully charged capacity of the battery cells. In such way, the rechargeable battery may have fewer chances to be fully charged at some less used time, which substantially increases the life of the battery.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A charging control method of rechargeable battery, wherein a rechargeable battery comprises a battery cell and a control unit in electrical connection with the battery cell, the method comprising using the control unit to execute the following steps:

charging the battery cell when a power supply unit is in connection with the battery cell;

recording the relative state of charge (RSOC) of the battery cell for a plurality of time intervals, each time interval comprising a plurality of timestamps; and when the RSOC of the battery cell reaches the full charge capacity (FCC) for n consecutive timestamps comprised by a first sub-section of an $N^{th}$ time interval and for n consecutive timestamps comprised by a second sub-section of an $N+1^{th}$ time interval, where the second sub-section corresponds to the first sub-section, the control unit limiting the power supply unit to charge the battery cell to not exceeding a specific proportion of the FCC at n consecutive timestamps comprised by a third sub-section of an $N+2^{th}$ time interval, where the third sub-section corresponds to the first sub-section and the second sub-section;

wherein N is a positive integer and n is a positive integer larger than 1.

2. The charging control method of claim 1, wherein each $N^{th}$ time interval is a day and each $N^{th}$ time interval comprises 24 timestamps.

3. The charging control method of claim 1, wherein n is an integer larger than 3 and smaller than 24.

4. The charging control method of claim 1, further comprising step: the control unit allowing the power supply unit to charge the battery cell to the FCC at the timestamps of the $N+2^{th}$ time interval that are not comprised by the third sub-section.

* * * * *